United States Patent [19]

Tokuda et al.

[11] Patent Number: 5,313,211
[45] Date of Patent: May 17, 1994

[54] PORTABLE DATA PROCESSING DEVICE CAPABLE OF TRANSMITTING PROCESSED DATA ON A RADIO BY REFLECTION OF UNMODULATED CARRIER SIGNAL EXTERNALLY APPLIED

[75] Inventors: Masamori Tokuda, Tenri; Hiroshi Nakano, Nara; Tomozo Ohta, Ikoma, all of Japan

[73] Assignee: Sharp Kabushiki Kaisha, Osaka, Japan

[21] Appl. No.: 741,608

[22] Filed: Aug. 7, 1991

[30] Foreign Application Priority Data

Aug. 13, 1990 [JP] Japan .................... 2-214837

[51] Int. Cl.[5] ........................... G01S 13/80
[52] U.S. Cl. ........................ 342/50; 342/51; 342/44
[58] Field of Search ............ 342/50, 51, 42, 44

[56] References Cited

U.S. PATENT DOCUMENTS

| | | |
|---|---|---|
| 4,075,632 | 2/1978 | Baldwin et al. |
| 4,114,151 | 9/1978 | Denne et al. |
| 4,160,971 | 7/1979 | Jones et al. |
| 4,656,472 | 4/1987 | Walton ............ 342/44 X |
| 4,694,297 | 9/1987 | Sewards .......... 342/45 |
| 4,786,907 | 11/1988 | Koelle ........... 342/51 |
| 4,816,839 | 3/1989 | Landt ............ 343/795 |
| 4,926,182 | 5/1990 | Ohta et al. ...... 342/44 |
| 4,926,187 | 5/1990 | Sugawara et al. .. 342/361 |
| 4,938,976 | 1/1991 | Ogata et al. ..... 342/42 |
| 5,021,790 | 6/1991 | Ohta et al. ...... 342/44 |

FOREIGN PATENT DOCUMENTS

| | | |
|---|---|---|
| 0308964 | 3/1989 | European Pat. Off. |
| 0324564 | 7/1989 | European Pat. Off. |
| 0328836 | 8/1989 | European Pat. Off. |
| 0343034 | 11/1989 | European Pat. Off. |
| 0479058A2 | 4/1992 | European Pat. Off. |
| 0486367A1 | 5/1992 | European Pat. Off. |

OTHER PUBLICATIONS

"Microwave Smart Tag" Matsushita Electric Works Giho No. 40 (Mar. 1990) pp. 14–17 (with translation).
"An X-band System Using Semipassive Signpost Reflectors for Automatic Location and Tracking of Vehicles" IEEE Feb. 1977.
"Data Carrier System and Adaption Thereof" J. IEE Japan, vol. 110 No. 1, 1990 -pp. 27–34.

Primary Examiner—John B. Sotomayor

[57] ABSTRACT

A detachable IC card applicable to a portable data processing device referred to as an "electronic organizer" is disclosed. The IC card is formed of microstrip lines formed on a dielectric substrate. An antenna receives an externally applied unmodulated carrier signal and guides the received signal to microstrip lines for impedance conversion. Cathode potential of a diode is varied in response to a data signal outputted from a CPU, so that the barrier capacitance of the diode varies. Accordingly, the carrier is reflected according to the data signal and radiated toward the electronic organizer main body through the antenna. An oscillator for data transmission is not required in the IC card, so that an internal battery having a large capacitance is not required, either. As a result, without increasing the size and weight of the device, radio transmission of data from the IC card can be accomplished.

15 Claims, 10 Drawing Sheets

PORTABLE DATA PROCESSING DEVICE CAPABLE OF TRANSMITTING PROCESSED DATA ON A RADIO BY REFLECTION OF UNMODULATED CARRIER SIGNAL EXTERNALLY APPLIED

BACKGROUND OF THE INVENTION

1. Field of the Invention

The present invention generally relates to portable data processing devices, and particularly to a portable data processing device capable of transmitting processed data with a radio under low power consumption. The present invention has particular applicability to a small size data processing device which is called "an electronic organizer".

2. Description of the Background Art

With development of larger scale integration of semiconductor devices, electronic equipments employing semiconductor devices have been more and more miniaturized recently. A portable computer includes various semiconductor devices of which sizes are made smaller and smaller with a higher scale of integration of the semiconductor devices and improvement of functions. Generally, well known portable computers include laptop personal computers, note type personal computers and small size data processing devices or portable personal computers which are called "electronic organizers". The present invention is generally applicable to the above-mentioned portable computers, but a case where the present invention is applied to the above-mentioned "electronic organizer" will be described in the description below.

In the electronic organizer, various functions such as a telephone book, schedule, watch, world watch, calendar, desk-top calculator, simple table calculation and memorandum are provided in a device of a pocket notebook size, which is very light weight and convenient for carrying around. Accordingly, a user can store data such as a list of clients, a schedule, names of products and a price list in the electronic organizer. When a contract is made outside the office, data related to the contract is inputted into the organizer. After the user comes back to the office, the stored contract data is transferred from the electronic organizer to a host computer through a communication function. The data for manufacturing is thus supplied to a manufacturing division through the host computer. In this way, the data management from manufacture to sales is extremely facilitated. Especially, various IC cards which can be exchanges have been developed recently, so that the electronic organizers are increasingly used for various purposes.

FIG. 10 is a block diagram of a conventional electronic organizer. Referring to FIG. 10, the electronic organizer includes a main body 3 of the electronic organizer, and an exchangeable IC card 4a employed with it. The electronic organizer main body 3 includes a controller 301, a memory 302, a display 303, an input key 304, and input/output (I/0) terminals or connectors 305 and 306. The IC card 4a includes a memory 401, and an I/O terminal 402. Various commands and data processed in electronic organizer main body 3 are supplied through input key 304 and processed in controller 301. The processed data is supplied to memory 302 and display 303. Programs for operational processings and inputted data are stored in memory 302. An inexpensive liquid crystal display is employed as display 303.

When IC card 4a is used, input/output terminal 305 of main body 3 and input/output terminal 402 of IC card 4a are connected to each other. Memory 401 of IC card 4a is formed of a read only memory (ROM), where programs for operational processings and data are stored. Main body 3 of electronic organizer 3 employs the programs and data through terminals 305 and 402. Such data stored in IC card 4a includes English-Japanese dictionary data, Japanese-English dictionary data, game software and the like. On the other hand, separately from the same, there is an IC card 4b shown in FIG. 11. The IC card 4b includes a memory 401, an I/O terminal 402, a rewritable memory 403 and a battery 404 as a DC power supply. Accordingly, the IC card 4b is suitable for handling a large amount of data such as address book data.

Programs and data are stored in memories 401 and IC cards 4a and 4b depending on the purposes, so that a single electronic organizer can be utilized for various purposes by exchanging IC cards. Furthermore, main body 3 of the electronic organizer has I/O terminal 306 in which data can be shared with a personal computer by connected an external equipment thereto, e.g., a personal computer. That is, the data stored in the electronic organizer is transmitted to the personal computer, where desired data processings are performed. The processed data is stored in a flexible disk. On the other hand, the data in the flexible disk also can be transmitted to the electronic organizer. Generally, data input through an input key provided in an input portion 304 of main body 3 of an electronic organizer takes a long time, so that data inputted through a personal computer are often transferred to the electronic organizer via a communication function. In this way, the application range of electronic organizers is very wide.

On the other hand, radio communication for the purpose of use in relatively short distances such as inside a factory of an office has increased. Typical examples of such radio communication equipment also include the private paging system and the low speed data transmission system. The private paging system includes an input device having a personal computer and the like, a base station and a branch station. In this system, a call transmission of character/voice information and the like are made by the radio communication from the base station to a portable receiver (branch station). The character/voice information is transmitted with a digital signal and displayed on a display of the portable receiver.

FIG. 12 is a block diagram of a portable receiver (branch station) of the conventional private paging system. Referring to FIG. 12, portable receiver 7 includes an antenna 71, a receiver 72, an oscillator 73 and a controller 74. A signal transmitted from the base station is received through antenna 71 and supplied to a first mixer 721 together with a signal produced from a local oscillator in oscillator 73. A first intermediate frequency signal (referred to as a "IF signal", hereinafter) obtained in mixer 721 is amplified by a first IF amplifier 722 and then supplied to a second mixer 723. A second IF signal obtained in the second mixer 723 is amplified by a second IF amplifier 724 and then demodulated into a digital signal by a demodulator 725. The demodulated data is supplied to a CPU 741, where operational processings are applied thereto. The processed data is displayed on display 743 and also stored in memory 742. Memory 742 stores a program and received data. Functions such as selection call, group call, and simulcast call etc. are provided for as calling functions of the branch station, with which, in hospitals, hotels, offices and so forth, doctors, nurses and workers, for example, are called or, information are transmitted to them.

On the other hand, the low speed data transmitting system includes a data terminal device such as a personal computer, a base station and a branch station. In this system, data of an office automation (OA) terminal such as a personal computer is bilaterally transmitted via radio at a transmission speed of 4800 bps or less. It can be used for purposes such as real time entry of data such as takings and orders in a store and management of stocks in a warehouse.

FIG. 13 is a block diagram of a branch station in the conventional low speed data transmission system. Referring to FIG. 13, a branch station 8 includes an antenna 81, a receiver 82, an oscillator 83, a controller 84, a transmitter 85 and a data input 86. In the description below, a case where the system is applied to ordering work in a restaurant will be described. When a customer orders a dish, the information is transmitted to a base station provided in a kitchen. That is, the data of ordering information (e.g., a name of the dish, the number of dishes, a table number) is inputted through data input 86. The data is subjected to operational processes in CPU 841. The inputted data is displayed in display 842 for confirmation. Next, the carrier sensing (carrier detection) is performed to detect a free channel. When a free channel is detected, the oscillating frequency of a local oscillator 832 is controlled so that a carrier of that frequency is generated. The carrier produced from local oscillator 832 is supplied to modulator 851 through a high frequency switch 831 switched to the transmitter 85 side. A modulation signal corresponding to data to be transmitted is applied to modulator 851 from CPU 841, and the carrier is modulated in response to the modulation signal. The power of the modulated signal is amplified by power amplifier 852. Then, an antenna switch 813 is on the transmitter 85 side. The amplified transmission signal, from which unnecessary signal components are removed by a bandpass filter 812, is transmitted toward the base station through antenna 811.

The base station receives the data transmitted from the branch station to provide a cook with ordering information by, for example, displaying the data on a CRT of a personal computer, or by outputting the data with a printer.

On the contrary, when the branch station receives information (how far the cooking has progressed) from the base station, a signal transmitted from the base station is received by antenna 811 and unnecessary signal components are removed by bandpass filter 812. The antenna switch 813 is on the receiver 82 side, so that the received signal is amplified by high frequency amplifier 821 and then supplied to first mixer 822. The high frequency switch 831 is on the receiver 82 side, so that a local oscillator signal produced from local oscillator 832 is also supplied to the first mixer 822. A first IF signal obtained by mixing in the first mixer 822 is amplified by a first IF amplifier 823 and then supplied to a second mixer 824. A second IF signal obtained in second mixer 824 is amplified by second IF amplifier 825 and then demodulated into a digital signal by demodulator 826. The demodulated data is supplied to CPU 841, where operational processings are performed thereto. The operationally processed data are displayed on display 842 and also stored in memory 843. The system can be also utilized as a radio modem having transmission speed of 4800 bps other than utilization in the ordering work in a family restaurant as described above.

As described above, although a conventional electronic organizer has a wide application range, an IC card cannot be used when it is separated from the electronic organizer main body. In addition, transmission/reception of data from and to the electronic organizer main body has to be necessarily made through communication I/O terminals.

As an example of transmitting/receiving data during travel for the above-described private paging system, a low speed data transmission system or the like are known, but the former has disadvantage that the data cannot be transmitted to the host computer side during travel since it is unilateral communication from the base station to the branch station. In addition, both of the systems have complicated circuit structure and the mobile station (a branch station) is provided with a local oscillator, resulting in an increase in consumption power. Accordingly, a considerably large battery is required for long time use, which has been an obstacle to miniaturization as well as an increase in weight. This also makes it impossible to provide a radio function to an IC card of an electronic organizer which is extremely small and light.

SUMMARY OF THE INVENTION

It is an object of the present invention to transmits processed data via radio transmission with low power consumption in a portable data processing device.

It is another object of the present invention to transmit processed data via radio transmission without increasing size and/or weight of the portable data processing device.

It is still another object of the present invention to transmit data from an IC card device to a data processing device via radio transmission under low power consumption in a portable computer system provided with a data processing device and an IC card device which are mutually detachable.

It is yet another object of the present invention to transmit data from an IC card to an electronic organizer main body via radio transmission with low power consumption in an IC card, in an electronic organizer.

Briefly stated, a portable data processing device according to the present invention includes a receiving antenna for receiving via radio transmission an unmodulated carrier signal for subsequent radio transmission, a data signal generating circuit for generating a data signal to be transmitted, a reflection circuit for reflecting the carrier signal in response to the data signal, and a radiation antenna for radiating via radio transmission the signal reflected by the reflection circuit. The reflection circuit includes a variable impedance circuit connected to ground potential, an impedance conversion circuit provided between the receiving antenna and the variable impedance circuit, and an impedance changing circuit for changing the impedance value of the variable impedance circuit in response to the data signal supplied from the data signal generating circuit.

In operation, an unmodulated carrier signal is externally supplied through the receiving antenna to be used for the data transmission. The received carrier signal is reflected by the reflection circuit in response to a data signal to be transmitted. The reflected signal includes a data signal to be transmitted and the transmission antenna transmits the reflected signal on a radio. Because the unmodulated carrier signal used for data transmission is externally supplied, there is no need of providing an oscillator for producing an unmodulated carrier signal. As a result, in a portable data processing device, an internal battery having large capacity is not required.

According to another aspect of the present invention, a portable data processing device includes a receiving antenna for receiving via radio transmission an unmodulated carrier signal for subsequent radio transmission of data and a modulated signal which is modulated with data, a data processing circuit for generating a processed data signal, a reflection circuit for reflecting the carrier signal received through the receiving antenna in response to the processed data signal, and a demodulating circuit for demodulating the modulated signal received through the receiving antenna and for outputting the demodulated data. The data processing circuit receives the demodulated data outputted from the demodulating circuit. The portable data processing device further includes a selection circuit for selectively guiding the received signal to the reflection circuit or the demodulating circuit in response to the signal received by the receiving antenna and a radiation antenna for radiating the signal reflected by the reflection circuit via radio transmission.

In operation, the unmodulated carrier signal and the modulated signal received by the receiving antenna are respectively supplied to the reflection circuit and the demodulation circuit through the selection circuit, so that the characteristics of the reflection circuit and the demodulating circuit are improved.

According to still another aspect of the present invention, a portable computer system includes a data processing device and an IC card device mutually detachable. The IC card device includes a receiving antenna for receiving via radio transmission an unmodulated carrier signal for subsequent radio transmission of data, a data signal generating circuit for generating a data signal to be transmitted, a reflection circuit for reflecting the carrier signal in response to the data signal, and a radiation antenna for radiating via radio transmission the signal reflected by the reflection circuit toward the data processing device. When the IC card device is detached from the data processing device, the data processing device receives radio transmission through &he radiation antenna to obtain the transmitted data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only and thus are not limitative of the present invention, and wherein.

DESCRIPTION OF THE PREFERRED EMBODIMENTS

Figure 1:
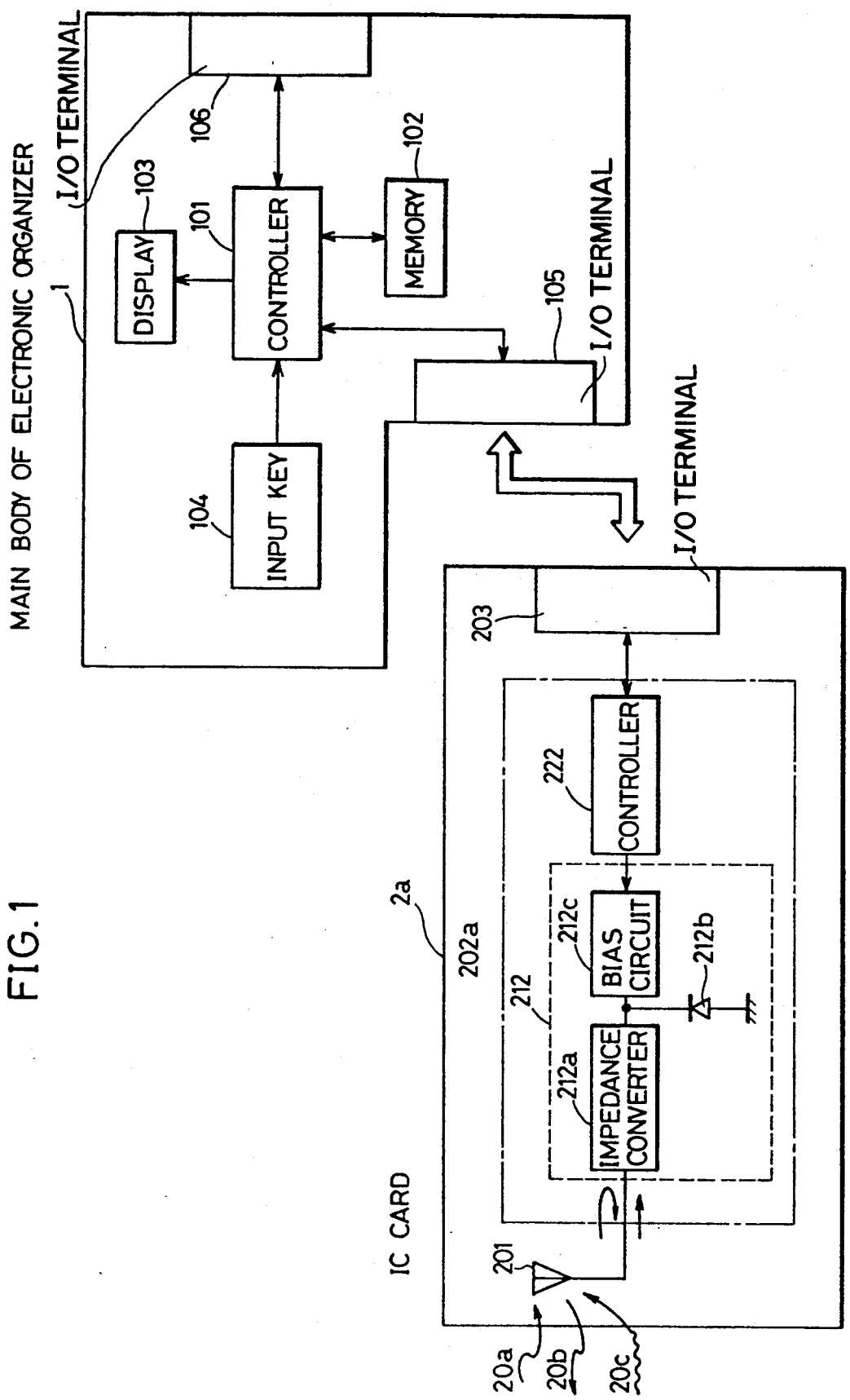
FIG. 1 is a block diagram of an electronic organizer indicating one example of the present invention.

FIG. 1 is a block diagram of an electronic organizer illustrating one embodiment of the present invention. Referring to FIG. 1, an electronic organizer main body 1 includes a controller 101, a memory 102, a display 103, an input 104, and I/O terminals 105 and 106. Programs for operational processes and data inputted by a user are stored in memory 102. Display 103 displays data or characters indicating operation results on a liquid crystal display. The input 104 includes a keyboard, through which various commands and data are inputted. I/O terminal 105 is a terminal for connection with attached IC card 2, through which program and data stored in IC card 2 are accessed. Terminal 106 is a terminal for communication by wire with external equipment such as a personal computer and a printer, through which data transmission and reception are performed between electronic organizer main body and external equipment, or between two electronic organizers.

IC card 2a includes an antenna 201, a modulator/demodulator 212, a controller 222 and an I/O terminal 203. The modulator/demodulator 212 includes an impedance converter 212a, a Schottky barrier diode 212b having its barrier capacitance varying in response to applied voltage, and a bias circuit 212c which applies a modulation signal to diode 212b or outputs a signal demodulated by diode 212b.

Figure 2:
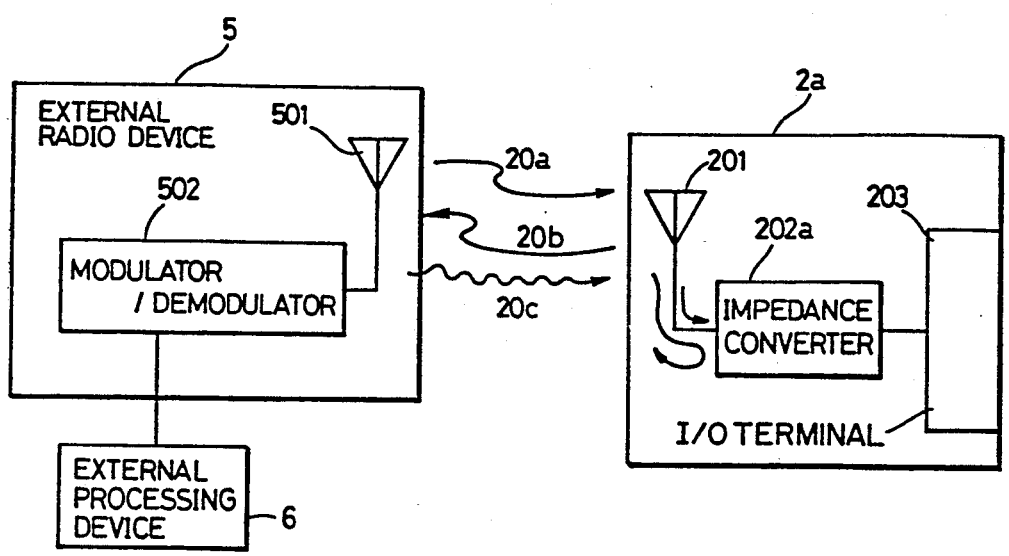
FIG. 2 is a conceptual diagram for describing the radio communication function of the IC card shown in FIG. 1.

FIG. 2 illustrates radio communication functioning of IC card 2a shown in FIG. 1. Referring to FIG. 2, an external radio device 5 which transmits and receives data to and from IC card 2a via radio transmission and an external processing device 6 for processing data are provided separately from IC card 2a. The external radio device 5 includes an antenna 501 and a modulator/demodulator 502.

Next, the operation will be described. First, a case is described in which data is transmitted from IC card 2a toward external radio device 5. External radio device 5 irradiates unmodulated carrier signal 20a toward IC card 2a. IC card 2a receives the carrier signal 20a through the antenna 201 and the signal is applied to the signal processing circuit 202a. The carrier signal 20a is modulated in response to the data to be transmitted in circuit 202a and the modulated signal 20b is radiated toward external radio device 5 through the antenna 201. External radio device 5 receives the transmitted signal 20b through the antenna 501, and demodulation is done in modulator/demodulator 502. The demodulated data is supplied to external processing device 6.

On the other hand, when data is transmitted from external radio device 5 to IC card 2a, the signal 20c modulated in modulator/demodulator unit 502 is radiated toward IC card 2a through the antenna 501. IC card 2a receives the transmitted signal 20c and obtains the transmitted data by demodulating the signal in circuit 202a.

Next, operation of IC card 2a shown in FIG. 1 is described. First, a case where data is transmitted from IC card 2a will be described. The data to be transmitted is supplied to controller 222 from the electronic organizer main body through I/O terminal 203, or stored in a memory provided in controller 222. External radio device 5 shown in FIG. 2 radiates unmodulated carrier 20a toward IC card 2a. The unmodulated carrier signal is received by the antenna 201 and supplied to a cathode of diode 212b through impedance converter 212a. On the other hand, controller 222 supplies a signal modulated in response to the data to be transmitted to the cathode of diode 212b through the bias circuit 212c. As a result, the unmodulated carrier signal is modulated in response to the data signal to be transmitted by diode 212b and reflected. The reflected signal is radiated toward external radio device 5 through impedance converter 212a and the antenna 201. The radiated signal is the signal 20b shown in FIG. 2, which is received and demodulated in external radio device 5 and then the demodulated data is supplied to external processing device 6.

Next, operation in a case where IC card 2a received data from external radio device 5 will be described. External radio device 5 shown in FIG. 2 radiates signal 20c modulated in response to data to be transmitted toward IC card 2a. The signal 20c is received by the antenna 201 in IC card 2a and the received signal is detected by diode 212b. The detected signal is supplied to controller 222 through bias circuit 212c. A demodulation amplifier is provided in controller 222, where the transmitted data is obtained by demodulation. The obtained data is stored in a memory in controller 222 or supplied to electronic organizer main body 1 through I/O terminal 203.

Figure 3A:
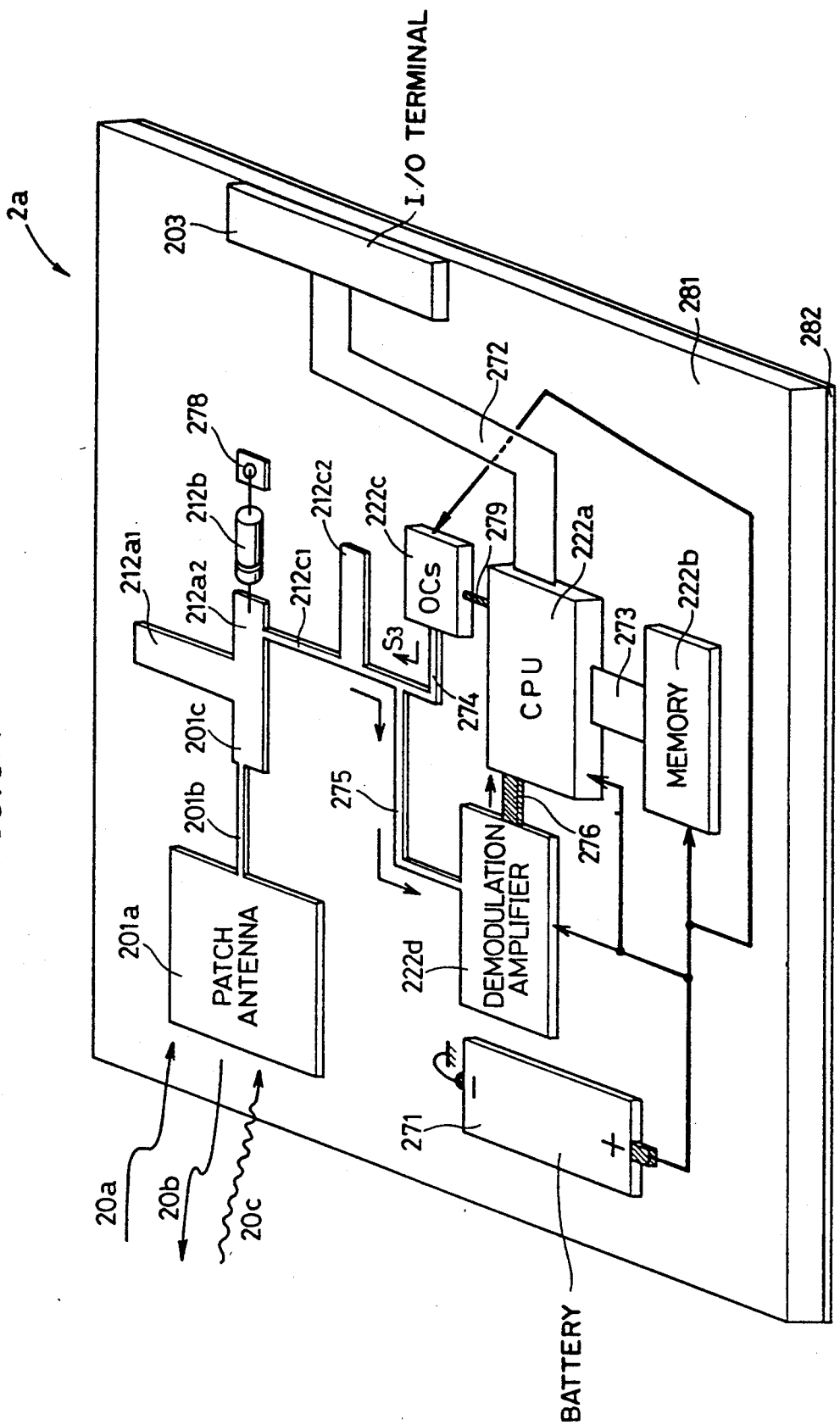
FIG. 3A is a more detailed block diagram of the IC card shown in FIG. 1.

FIG. 3A is a more detailed block diagram of the IC card 2a shown in FIG. 1. Referring to FIG. 3A, the circuit structure of IC card 2a will be described below. Microstrip lines are used for implementing a radio communication function using radiowaves in the microwave band (frequency not less than 1 GHz). That is, the circuit shown in FIG. 3A is configured as a printed circuit by an etching technique on a dielectric substrate 281. The entirety of the back side of dielectric substrate 281 is covered with copper foil 282.

The antenna 201 shown in FIG. 1 includes a patch antenna 201a, an impedance converting circuit 201b and 501 line 201c. Either of rectangular or circular patch antenna 201a may be employed. The width, the length and the diameter of patch antenna 201a are determined in consideration of used frequency, band width and directivity. Impedance converting circuit 201b is provided to implement impedance matching of patch antenna 201a and 50 Ω line 201c. The length of the circuit 201b is usually set $\frac{1}{4}$ the wavelength $\lambda g$ of a signal on dielectric substrate 281.

Figure 3B:
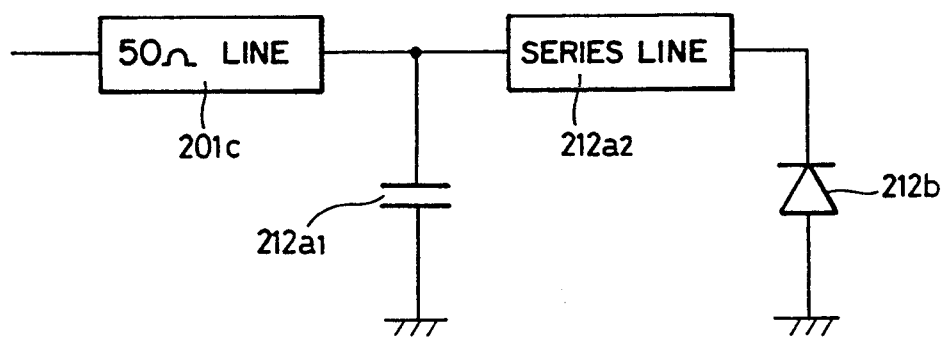
FIG. 3B is an equivalent circuit of FIG. 3A in the vicinity of the impedance converter.

The impedance converter 212a shown in FIG. 1 includes a parallel stub $212a_1$ shown in FIG. 3A and a series line $212a_2$. the impedance of diode 212b is converted by parallel stub $212a_1$ and series line $212a_2$. The length and width of parallel stub $212a_1$ and series line $212a_2$ are set so that the carrier received by antenna 201a is totally reflected when bias to diode 212b is a high potential and the carrier is absorbed (matched) when it is a low potential, for example. An equivalent circuit about parallel stub $212a_1$ and series line $212a_2$ is shown in FIG. 3B.

Schottky barrier diode 212b has its cathode connected to one end of series line $212a_2$ and its anode connected to a ground conductor 282 through a through hole 278. It is varying ratio at low voltage (0 through 3.6 Volt) and has good detecting characteristics for microwaves.

The bias circuit $212c_1$ shown in FIG. 1 includes a high impedance line $212c_1$ having its length of $\lambda g/4$ and an end open stubline $212c_2$ having its length of $\lambda g/4$. The combination of lines $212c_1$ and $212c_2$ works as an RF choke at the designed frequency, so that a high frequency signal is not transmitted to CPU 222a side. Impedance converter 212a is not affected, either. A chip capacitor may be used in place of line $212c_2$.

The controller 222 shown in FIG. 1 includes a CPU 222a, a memory 222b, a sub-carrier generator 222c and a demodulation amplifier 222d. CPU 222a supplies data to be transmitted to the sub-carrier generator 222c through a signal line 279. CPU 222A inputs/outputs data in/from electronic organizer main body 1 through a communication bus 272 and I/O terminal 203. The data is written in/read from memory 222b through communication bus 273. Furthermore, CPU 222a receives data transmitted through data line 276 from demodulation amplifier 222d. A SRAM is used as memory 222b. CPU 222a supplies address, data, control signals and so forth to memory 222b through the communication bus 273. Sub-carrier generator 222c generates a sub-carrier and also performs amplitude modulation of the sub-carrier in response to data to be transmitted supplied from the CPU 222a. The modulation scheme is Amplitude Shift keying (ASK). The modulated signal is supplied to bias circuit 212c through signal line 274. The demodulation amplifier (decoder) 222d amplifies the signal received from external radio device 5 and then detects and converts (decodes) the signal into a digital signal. The converted data is supplied to CPU 222a through data line 276.

A lithium battery 271 is provided for supplying power to CPU 222a, memory 222b, sub-carrier generator 222c and demodulation amplifier 222d. It is pointed out that the battery 271 is not provided for the purpose of amplifying the reflected signal toward external radio device 5. That is, data transmission is mace by reflection of unmodulated carrier 20a supplied from external radio device 5.

Next, operation of IC card 2a shown in FIG. 3A will be described. First, when data is transmitted, unmodulated carrier 20a is received through antenna 201a. The received carrier is led to the cathode of diode 212b. Data to be transmitted is supplied to sub-carrier generator 222c from CPU 222a through signal line 279. Sub-carrier generator 222c amplitude-modulates the sub-carrier in response to the supplied data and supplies the carrier in response to the supplied data and supplies the modulated signal to the cathode of diode 212b through signal line 274.

Figure 4A:
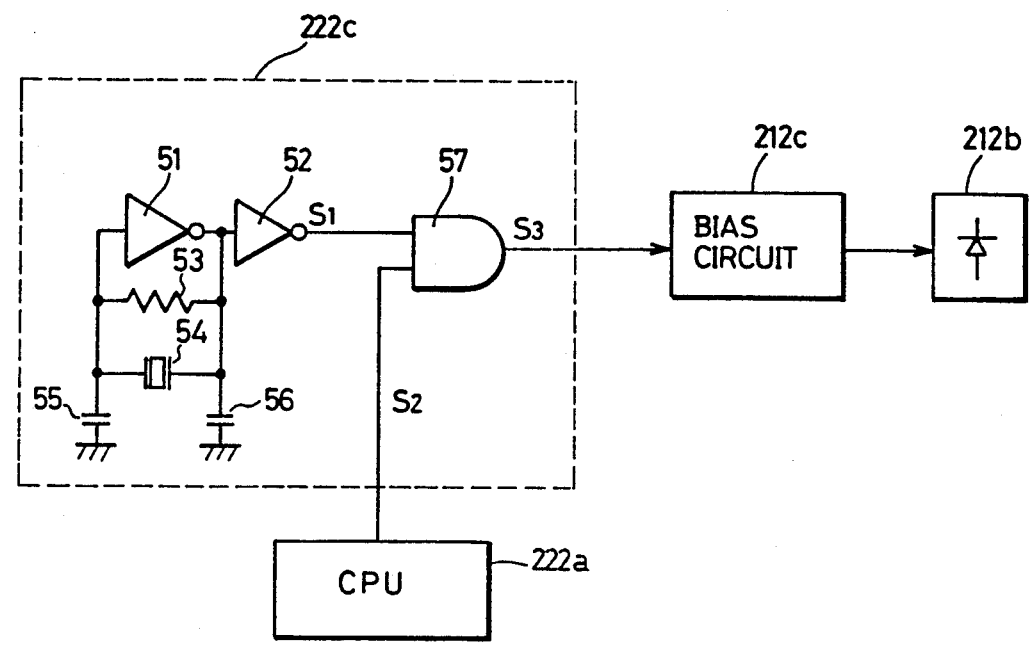
FIG. 4A is a circuit diagram of the sub-carrier generator shown in FIG. 3A.

FIG. 4A is a circuit diagram of the sub-carrier generator 222c shown in FIG. 3A. Referring to FIG. 4A, sub-carrier generator 222c includes inverters 51 and 52, a feedback resistor 53, a crystal resonator (or a ceramic resonator) 54, pull-down capacitors 55 and 56, and an AND gate 57 for amplitude modulation. Inverter 52 generates a sub-carrier signal S1 and supplies the signal to one input of AND gate 57. A data signal S2 to be transmitted is supplied to the other input of AND gate 57 from CPU 222a. AND gate 57 outputs a modulated signal S3 and supplies the signal to bias circuit 212c.

Figure 4B:
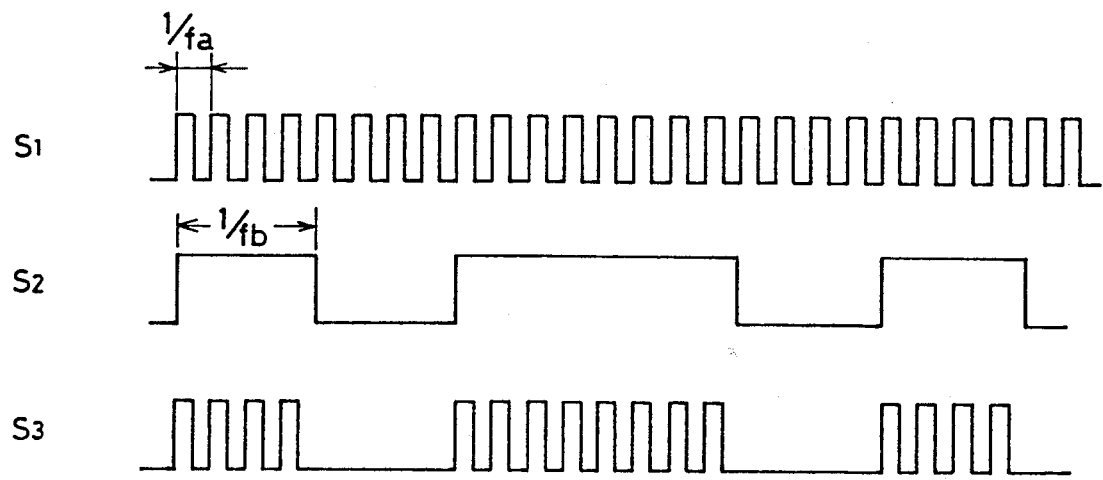
FIG. 4B is a signal waveform diagram for describing operation of the sub-carrier generator shown in FIG. 4A.

FIG. 4B is a signal waveform diagram for describing operation of sub-carrier generator 222c. Referring to FIG. 4B, the generated carrier signal S1 has frequency of fa (10.7 MHz, for example) and the data signal S2 has frequency of fb (19.2 kb/second, for example). In FIG. 4B, to simplify the description, an example in which fa=4fb is shown. In operation, AND gate 57 receives a subcarrier signal S1 and a data signal S2 to produce a modulated signal S3.

Turning to FIG. 3A again, modulated signal S3 is supplied to the cathode of diode 212b. At the cathode of diode 212b, the unmodulated carrier received through antenna 201a and this modulation signal are superimposed. As a result, for example, when the modulated signal S3 indicates low potential (0 volt, for example), the unmodulated carrier is absorbed by diode 212b. On the other hand, when the modulated signal S3 is of high potential (3.6 volt of reverse bias, for example), the unmodulated carrier is totally reflected In other words, the impedance converter 212a is designed so that it is totally reflected. Accordingly, the unmodulated carrier is amplitude-modulated in response to data to be transmitted and the amplitude-modulated signal is reflected. The reflected signal is radiated toward external radio device 5 through antenna 201a as a signal 20b.

Figure 5:
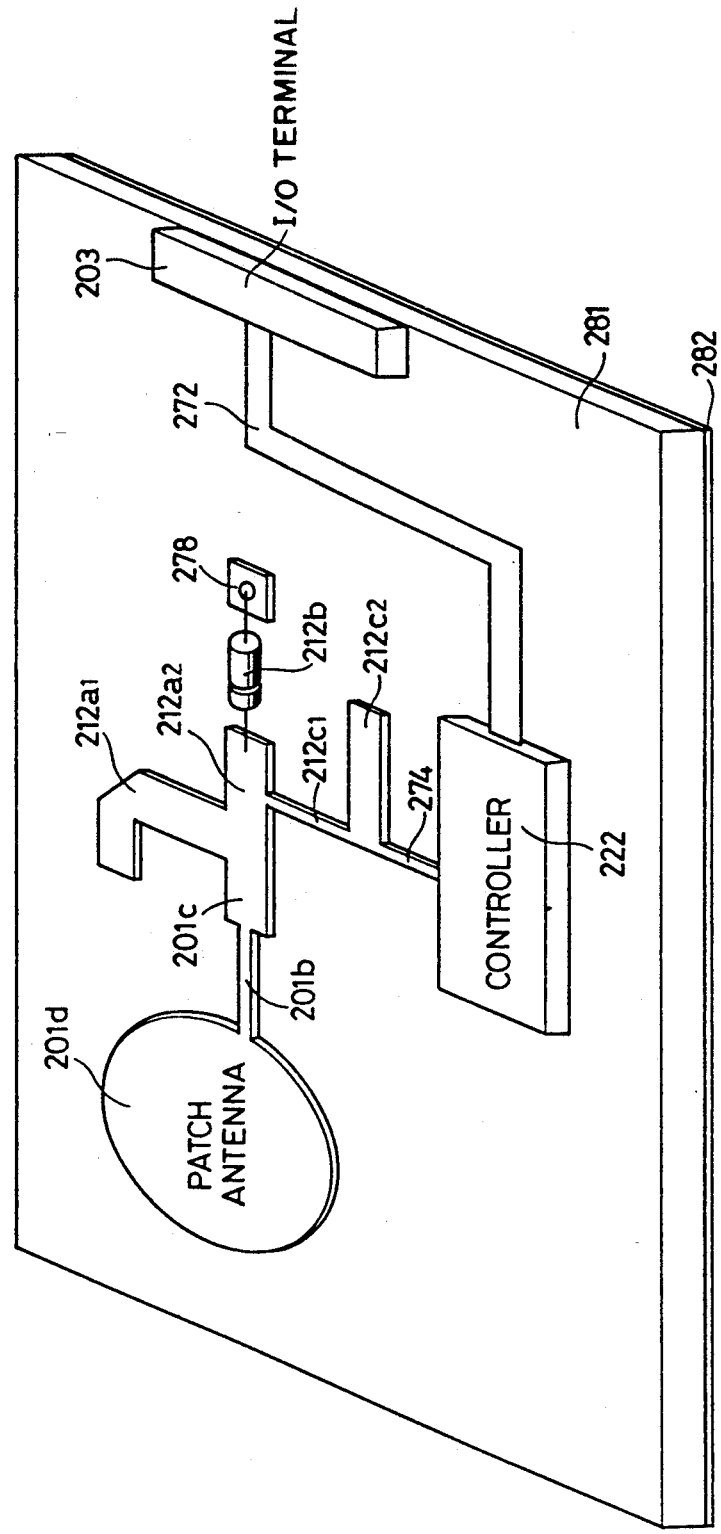
FIG. 5 is a block diagram of the IC card indicating another embodiment of the present invention.

FIG. 5 is a block diagram of an IC card 2a' illustrating another embodiment of the present invention. As compared to the IC card shown in FIG. 3A, a circular type patch antenna 201d is used and a CPU, a memory, a sub-carrier generator and a demodulation amplifier are provided on a single chip as a controller 222. Furthermore, a battery is not provided, where power supply voltage necessary for driving controller 222 is supplied from the electronic organizer main body 1 side through I/O terminal 203. The operation of IC card 2a' is basically same as that shown in FIG. 3, so that the description is not repeated.

Figure 6:
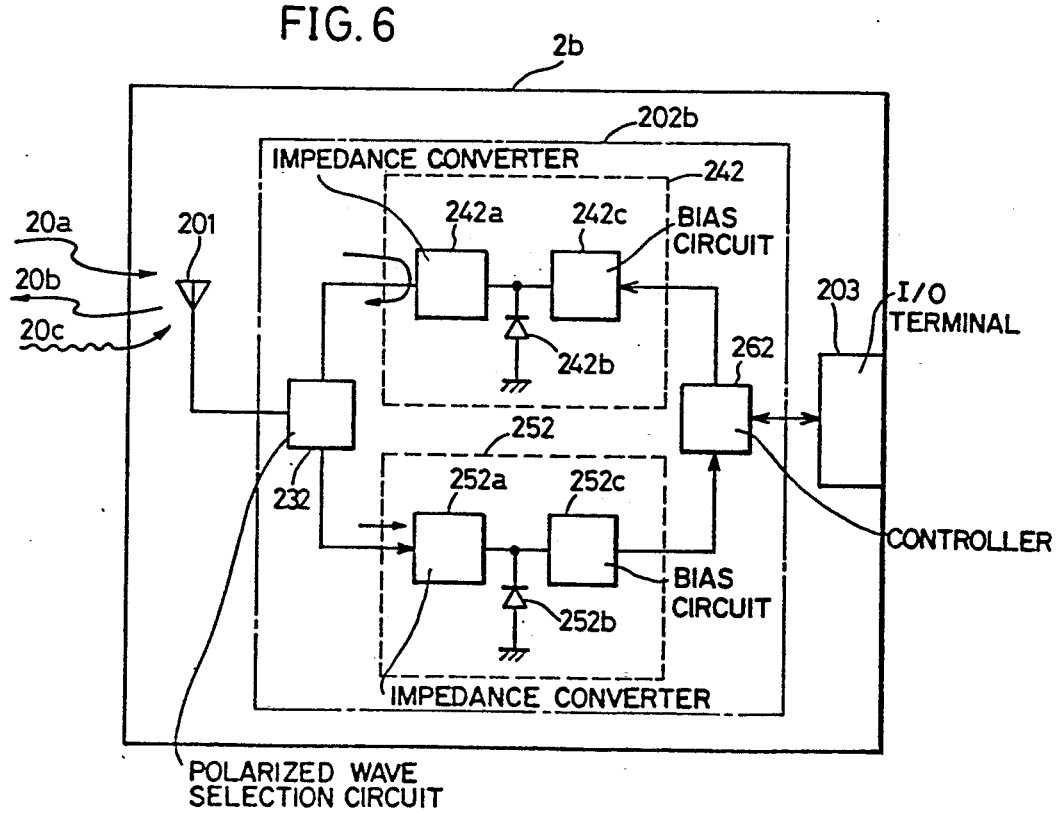
FIG. 6 is a block diagram of an IC card showing another embodiment of the present invention.

FIG. 6 is a block diagram of an IC card 2b illustrating still another embodiment of the present invention. Referring to FIG. 6, the IC card 2b includes a antenna 201, a polarized wave selection circuit 232, a reflection type modulator 242, a demodulator 252, a controller 262, and an I/O terminal 203. Reflection type modulator 242 includes an impedance converter 242a, a Schottky barrier diode 242b having its barrier capacitance which varies corresponding to applied voltage and a bias circuit 242c which applies a modulation signal to a cathode of diode 242b. Demodulator 252 includes an impedance converter 252a, a Schottky barrier diode 252b and a bias circuit 252c for receiving a signal demodulated by diode 252b.

Next, operation is described. First a case where data stored in IC card 2b or data provided from electronic organizer main body 1 is transmitted will be described. An unmodulated carrier signal 20a radiated from external radio device 5 is received by the antenna 201 and the received signal, which is a first polarized wave, is selectively applied to reflection type modulator 242 by polarized wave selection circuit 232. The unmodulated carrier applied to modulator 242 is modulated in response to data signal to be transmitted supplied from controller 262 through bias circuit 242c and reflected. By appropriately designing impedance converter 242a as described above, amplitude shift keying (ASK) can be applied to unmodulated carrier 20a. The amplitude-modulated signal is radiated toward external radio device 5 through polarized wave selection circuit 232 and the antenna 201.

Next, when data transmitted from external radio device 5 is received, a signal 20c modulated with data is received by antenna 201. The received signal is the second polarized wave, so that it is selectively provided to demodulator 252 by polarized wave selection circuit 232. Impedance converter 252a is designed to match with the received modulation wave 20c, so that a large detection output signal can be obtained by diode 252b. The detection output signal is applied to controller 262 through bias circuit 252c, where transmitted data is obtained by demodulation.

Figure 7B:
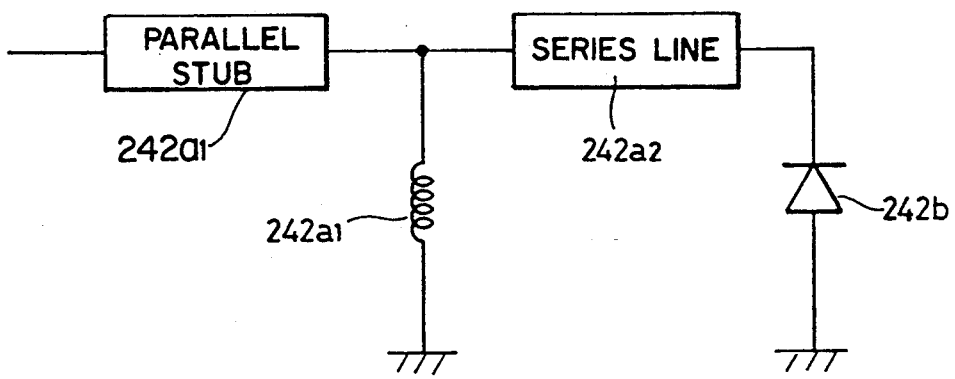
FIG. 7B is an equivalent circuit diagram of FIG. 7A in the vicinity of the impedance converter.
Figure 7A:
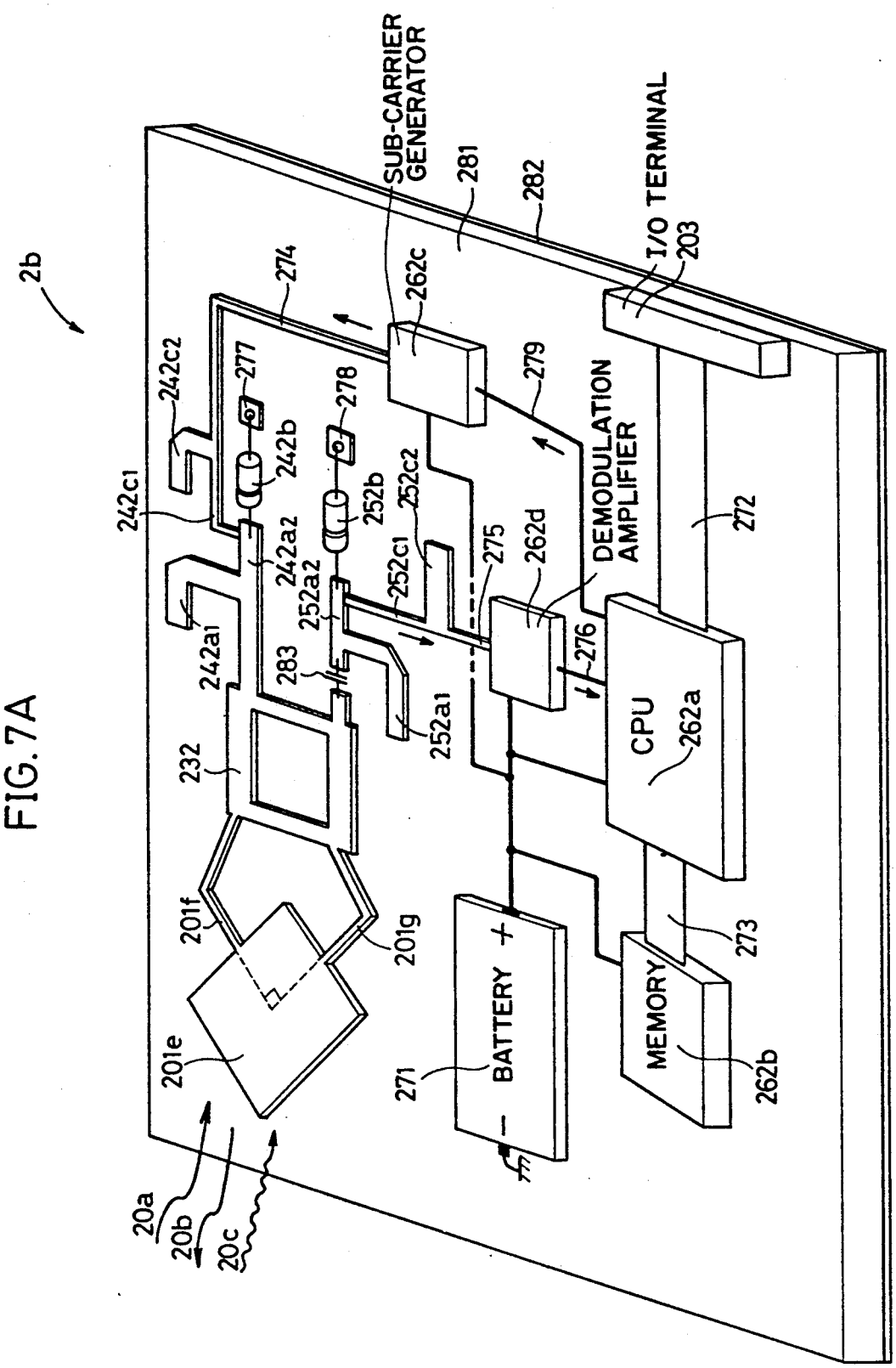
FIG. 7A is a more detailed block diagram of the IC card shown in FIG. 6.

FIG. 7A is a more detailed block diagram of the IC card 2b shown in FIG. 6. Since the basic structure of the IC card 2b is the same as that shown in FIG. 3A, only peculiar features will be described below. A rectangular patch antenna (one of circular type is also applicable) 201e can receive both of the left-handed circularly polarized wave and the right-handed circularly polarized wave. Lines 201f and 201g are connected at positions geometrically separated by 90° from each other at antenna 201e. The lines 201f and 201g form an impedance converting circuit to implement impedance matching of antenna 201e and polarized wave selection circuit (50 Ω system) 232. Each line normally has a length of $\lambda g/4$.

The polarized wave selection circuit 232 shown in FIG. 6 is formed of 3 dB hybrid line 232. The hybrid line 232 applies a received signal to demodulator 252 when a right-hand circularly polarized wave signal is received and applies a received signal to reflection type modulator 242 when a left-hand circularly polarized wave signal is received. That is, the polarized wave selection circuit 232 selectively leads a received signal to demodulator 252 or modulator 242 in correspondence with the polarization of the received signal. In this embodiment, it is assumed that the above-mentioned carrier 20a includes a left-hand circularly polarized wave, and that the signal 20c includes a right-hand circularly polarized wave.

The impedance converter 242a shown in FIG. 6 includes a parallel stub $242a_1$ and a series line $242a_2$, where impedance conversion of diode 242b is done. An equivalent circuit to the portion of the impedance converter 242a is shown in FIG. 7B.

The bias circuit 242c shown in FIG. 6 includes a high impedance line $242c_1$, and $\lambda g/4$ open stub line $242c_2$.

The impedance converter 252a shown in FIG. 6 includes a parallel stub $252a_1$ and a series line $252a_2$, which converts impedance of diode 252b to match it to 50 Ω.

The bias circuit 252c shown in FIG. 6 includes a high impedance line 252c₁ and λg/4 open stub line 252c₂, which applies the signal detected by diode 252b to demodulation amplifier 262d.

The controller 262 shown in FIG. 6 includes a CPU 262a, a memory 262b, a sub-carrier generator 262c and a demodulation amplifier 262d, which operates similarly to that shown in FIG. 3.

Capacitor 283 connected between hybrid line 232 and parallel stub 252a₁ is provided for the purpose of direct current blocking. Capacitor 283 prevents a modulation signal and a detected signal from interfering with each other.

Next, operation of the IC card 2b shown in FIG. 7A will be briefly described. First, when data is transmitted, an unmodulated carrier signal 20a which is left-hand circularly polarized is received by antenna 201e. The received signal 20a is led to the cathode of diode 242b by hybrid line 232. On the other hand, a modulated signal produced from sub-carrier generator 262c (corresponding to the signal S3 shown in FIG. 4B) is also applied to the cathode of diode 242b. Accordingly, the unmodulated carrier is amplitude-modulated with the modulated signal and also reflected. The reflected signal is radiated as a signal 20b through b\hybrid line 232 and antenna 201e.

On the other hand, when the IC card 2b receives transmitted data, a modulated signal 20c which is right-handed circularly polarized is received by antenna 201e. The received signal is selectively applied to the cathode of diode 252b by hybrid line 232. Accordingly, detection is effected by diode 252b and the detected signal is applied to demodulation amplifier 262d. Demodulation amplifier 262d decodes the detected signal and applies the decoded signal, or the transmitted data to CPU 262a.

Thus, depending on a type of polarization of a signal transmitted from external radio device 5 on a radio, hybrid line 232 selectively leads a received signal to a cathode of diode 242b or 252b. As a result, reflection type modulator 242 and demodulator 252 can be independently circuit-configured, respectively, so that the characteristics in signal processings can be improved as compared to the IC card 2a shown in FIG. 3A.

Figure 8:
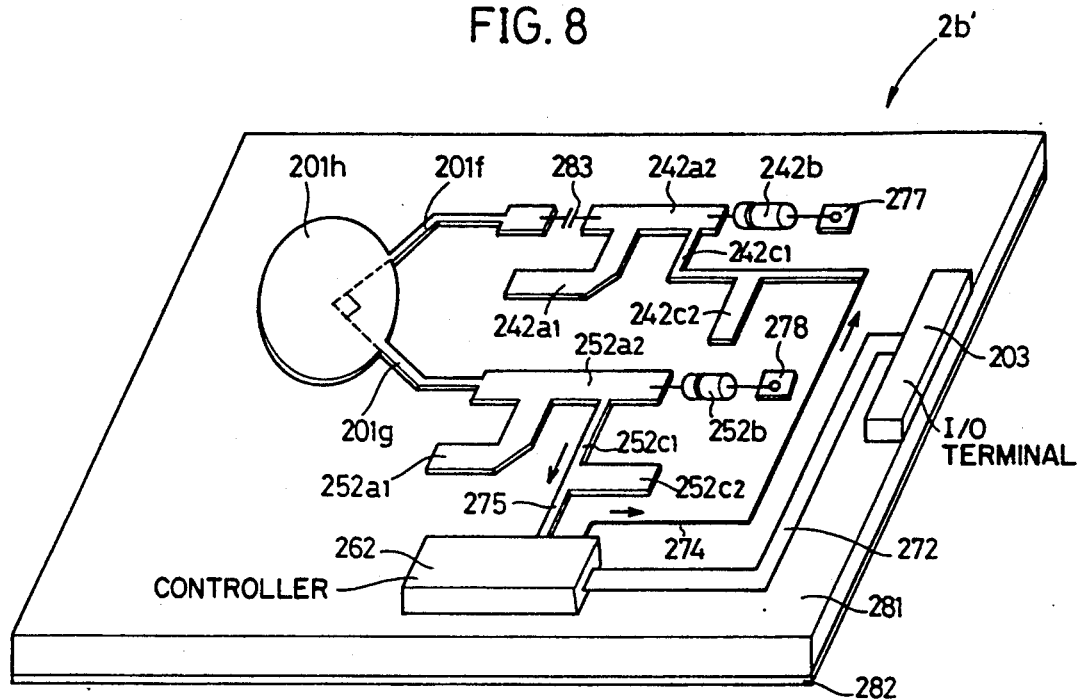
FIG. 8 is a block diagram shown an IC card indicating still another embodiment of the present invention.

FIG. 8 is a block diagram of an IC card 2b' illustrating yet another embodiment of the present invention. Referring to FIG. 8, lines 201f and 201g are connected at positions geometrically separated by 90° from each other at a circular patch antenna 201h. Thus, two received linearly polarized signals perpendicular to each other can be separated. For example, when an unmodulated carrier signal 20a which is horizontally linear polarized is received by antenna 201h, the received unmodulated carrier signal is led to reflection type modulator 242 through line 201f configuring an impedance converting circuit. On the other hand, when a signal 20c which is vertically linear polarized is received, the received signal is led to demodulator 252 through line 201g configuring an impedance converting circuit. Thus, the signals received by antenna 201h can be selectively guided through impedance converters 201f and 201g resulting in no requirement of the polarized wave selection circuit 232 shown in FIG. 6. Processings about the selectively guided signals in reflection type modulator 242 and demodulator 252 are the same as those in the case of IC card 2b shown in FIG. 7, so 2b' shown in FIG. 8 is different from one shown in FIG. 7A in that controller 262 is formed on a single chip and power supply is provided from electronic organizer main body 1 through I/O terminal 203.

Figure 9:
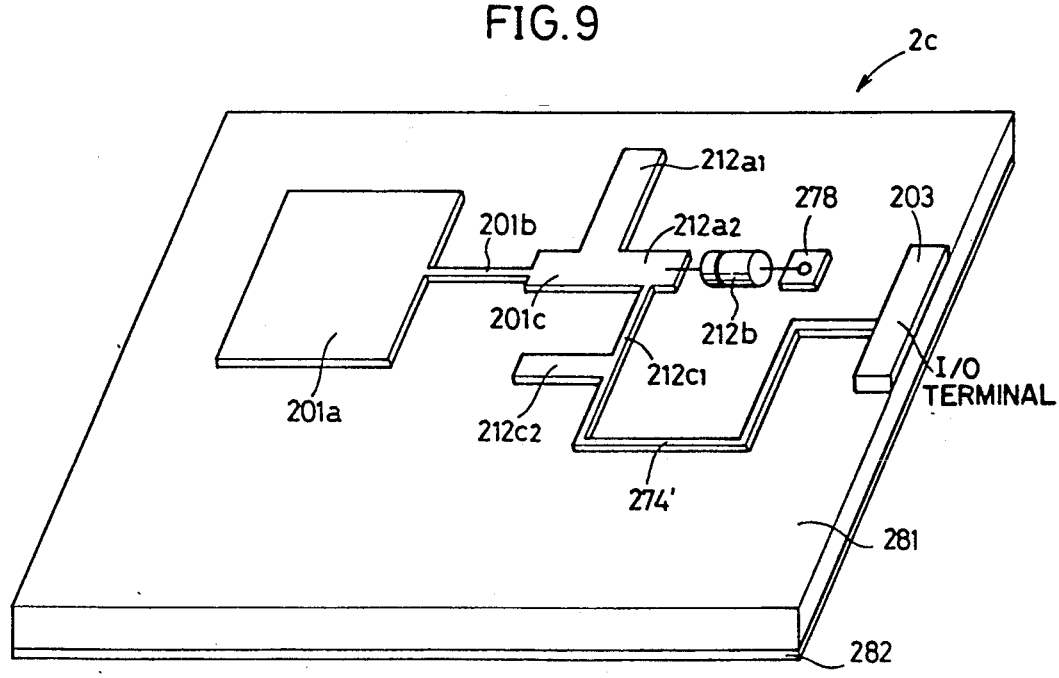
FIG. 9 is a block diagram showing yet another embodiment of the present invention.
Figure 10:
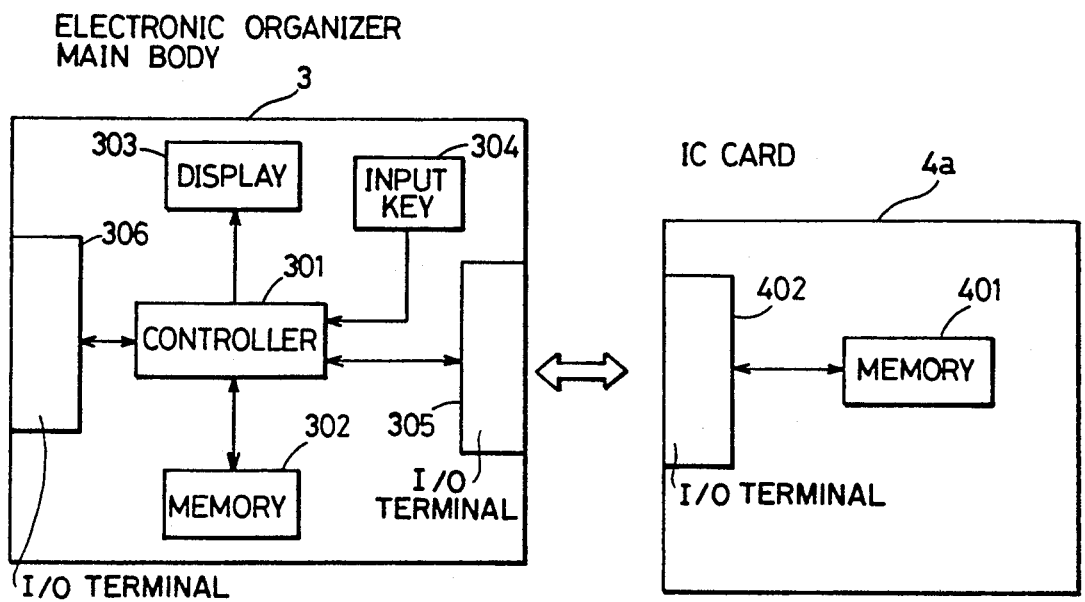
Figure 11:
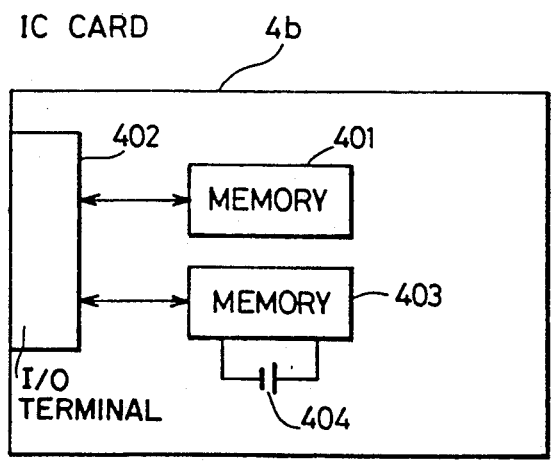
FIG. 11 is a block diagram of a conventional IC card.
Figure 12:
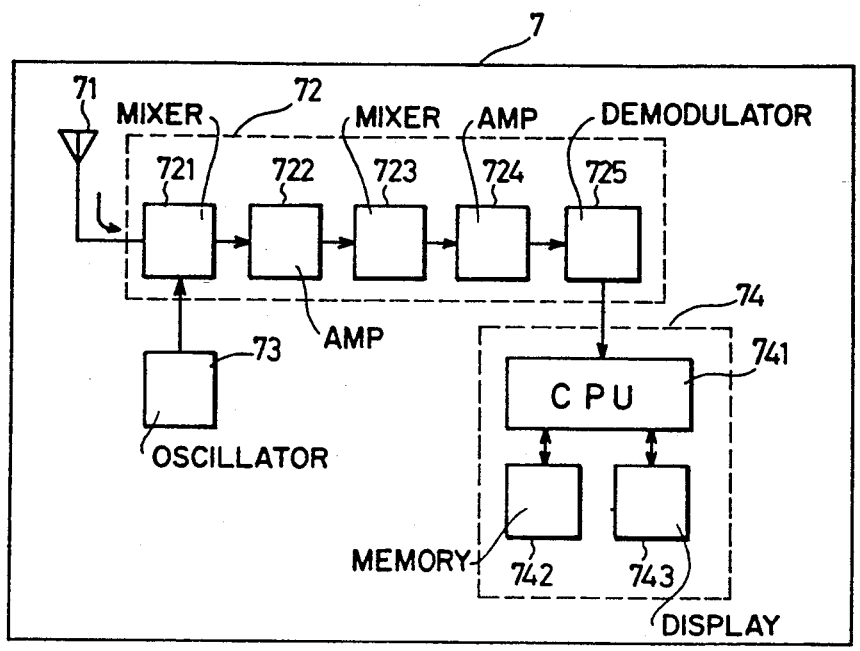
FIG. 12 is a block diagram of a branch station of a conventional private paging system.
Figure 13:
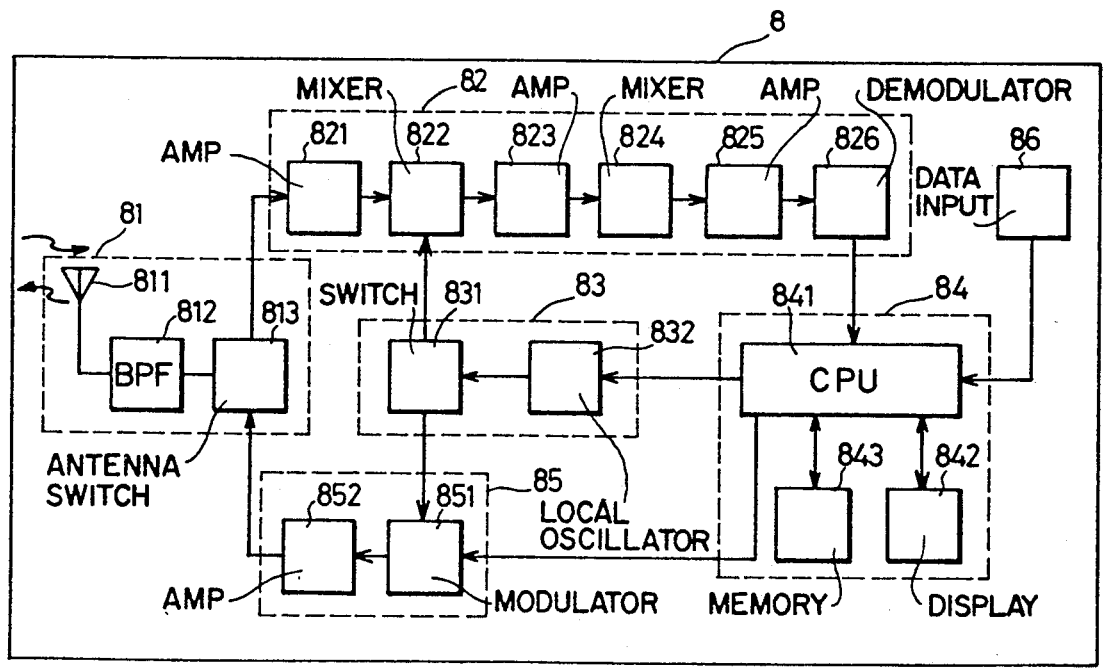
FIG. 13 is a block diagram of a branch station in a conventional low speed data transmitting system.

FIG. 9 is a block diagram illustrating an IC card 2c indicating still another embodiment of the present invention. As compared to the IC card 2a' shown in FIG. 5, it is different in that controller 222 is omitted and a rectangular antenna 201 is employed as an antenna. The controller and the power supply are omitted, so that the processings to be performed by controller 222 shown in FIG. 5 are performed from electronic organizer main body 1 through I/O terminal 203.

As described above, it is pointed out that a local oscillator for transmission is not required since a carrier signal necessary for data transmission is obtained from an unmodulated carrier signal externally applied via radio transmission in any of the embodiments described above. Generally, a local oscillator consumes a large amount of power, so that it requires a battery with large current capacity. Accordingly, it has been impossible to provide a small IC card with a data transmitting function, but radio transmission of data is enabled by utilizing an externally applied unmodulated carrier as described in the embodiments. In addition, as the IC card 2b shown in FIG. 6, provision of a selectively guiding circuit such as the polarized wave selection circuit 232 for selectively guiding the unmodulated carrier signal 20a and the signal 20c modulated with data enables to provide reflection type modulator 242 and demodulator 252 individually. This contributes in improving characteristics of modulation and demodulation. Such an IC card as described in the above embodiments can be used attached to or separated from electronic organizer main body 1, and a user that is traveling can bilaterally transmit data via radio transmission toward external radio device 5. As a result, the electronic organizer can be used for a more variety of purposes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable data processing device, comprising:
receiving means for receiving via radio transmission an unmodulated carrier signal;
data signal generating means for processing externally applied data and generating a transmission data signal;
reflecting means, coupled to said receiving means, for reflecting the unmodulated carrier signal in accordance with the transmission data signal; and
radiating means, coupled to said reflecting means, for radiating the signal reflected by said reflecting means via radio transmission as a modulated carrier,
said reflecting means comprising
variable impedance means coupled to a predetermined reference potential, an impedance of said variable impedance means changing in response to an applied reverse bias voltage,
impedance conversion means coupled between said receiving means and said variable impedance means, and
impedance varying means for varying an impedance value of said variable impedance means by applying the reverse bias voltage in response to the transmission data signal applied from said data signal generating means.

2. The portable data processing device according to claim 1, wherein said data signal generating means comprises data processing means for processing the externally applied data and processing the transmission data signal.

3. The portable data processing device according to claim 2, wherein said receiving means also receives a data modulated carrier via radio transmission which is modulated with instruction data, said portable data processing device further comprising:
 detecting means for detecting the data modulated carrier; and
 decoder means for decoding an output signal from said detecting means to generate the instruction data,
 said data processing means processing the instruction data outputted from said decoder means as the externally applied data.

4. The portable data processing device according to claim 1, wherein said data signal generating means includes connector means for connecting said portable data processing device to a detachable data processing device,
 said connector means supplying a data signal from said detachable data processing device to said data signal generating means as the externally applied data.

5. The portable data processing device according to claim 1, further comprising:
 a dielectric substrate having first and second main surfaces; and
 a conductor plate formed on the second main surface of said dielectric substrate coupled to said predetermined reference potential,
 said receiving means, said data signal generating means, said reflecting means and said radiating means being formed on the first main surface of said dielectric substrate.

6. The portable data processing device according to claim 5, wherein said variable impedance means comprises variable capacitance means having first and second electrodes, said first electrode being connected to said impedance varying means and said second electrode being connected to said conductor plate.

7. The portable data processing device according to claim 5, wherein said impedance conversion means comprises a first microstrip line extending on the first main surface of said dielectric substrate connected between said receiving means and said variable impedance means and having a first predetermined shape.

8. The portable data processing device according to claim 7, wherein said impedance varying means comprises a second microstrip line extending on the first main surface of said dielectric substrate connected between said variable impedance means and said data signal generating means and having a second predetermined shape,
 said second microstrip line supplying the transmission data signal from said data signal generating means to said variable impedance means.

9. The portable data processing device according to claim 6, wherein said variable capacitance means comprises a Schottky barrier diode having a cathode connected to said impedance varying means and an anode connected to said conductor plate.

10. The portable data processing device according to claim 5, wherein said receiving means comprises:
 a first microstrip antenna extending on the first main surface of said dielectric substrate for receiving said unmodulated carrier signal via radio transmission and
 a second microstrip antenna extending on the first main surface of said dielectric substrate for radiating the signal reflected by said reflecting means via radio transmission as the modulated carrier.

11. The portable data processing device according to claim 1, further comprising:
 sub-carrier signal generating means; and
 amplitude modulation means for amplitude-modulating a sub-carrier signal in response to the transmission data signal,
 said impedance varying means varying the impedance value of said variable impedance means in response to a modulated data signal applied from said amplitude modulation means.

12. A portable data processing device, comprising:
 receiving means for receiving an unmodulated carrier signal and a data modulated carrier signal modulated with instruction data via radio transmission;
 data processing means for generating a processed data signal;
 reflecting means for reflecting the unmodulated carrier signal received by said receiving means as a modulated carrier signal, said reflecting means comprising
  variable impedance means coupled to a predetermined reference potential, an impedance of said variable impedance means changing in response to an applied reversed bias voltage,
  impedance conversion means coupled between said receiving means and said variable impedance means, and
  impedance variable means for varying an impedance value of said variable impedance means by applying the reverse bias voltage in response to the processed data signal;
 demodulating means for demodulating the modulated carrier signal received by said receiving means into the instruction data, the instruction data being supplied to said data processing means;
 selective circuit means, coupled to said receiving means, said reflecting means and said demodulating means, for selectively guiding the unmodulated carrier signal and the data modulated carrier signal received by said receiving means to said reflecting means or said demodulating means respectively; and
 radiating means, coupled to said reflecting means, for radiating the signal reflected by said reflecting means via radio transmission as the modulated carrier signal.

13. The portable data processing device according to claim 12, further comprising:
 a dielectric substrate having first and second main surfaces; and
 a conductor plate formed on the second main surface of said dielectric substrate and having a predetermined reference potential,
 said receiving means, said data processing means, said reflecting means, said demodulating means, said selective circuit means and said radiating means being formed on the first main surface of said dielectric substrate.

14. The portable data processing device according to claim 13, wherein the unmodulated carrier signal is one of right-hand circularly polarized or left-hand circularly polarized and the data modulated carrier signal is the other one of right-hand circularly polarized and left-hand circularly polarized, said selective circuit means comprising:
- a first microstrip line extending on said dielectric substrate and having a first end connected to said reflecting means, and
- a second microstrip line extending on said dielectric substrate and having a second end connected to said demodulating means, said first and second microstrip lines each having a second end connected to said receiving means perpendicular to each other.

15. The portable data processing device according to claim 13, wherein said demodulating means comprises:
- detecting means coupled to receive and detect the data modulated carrier signal received by said receiving means through said selective circuit means; and
- decoder means for decoding an output signal outputted by said detecting means to output the instruction data, the instruction data being supplied to said data processing means.

* * * * *